US012699609B2

(12) United States Patent
Prakash et al.

(10) Patent No.: US 12,699,609 B2
(45) Date of Patent: *Aug. 4, 2026

(54) PREDICTING AND REDUCING HARDWARE RELATED OUTAGES

(71) Applicant: T-Mobile USA, Inc., Bellevue, WA (US)

(72) Inventors: Karey Krupa Satya Prakash, Renton, WA (US); Anand Samuel Injeti, Frisco, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 274 days.

This patent is subject to a terminal disclaimer.

(21) Appl. No.: 17/897,470

(22) Filed: Aug. 29, 2022

(65) Prior Publication Data

US 2022/0413951 A1 Dec. 29, 2022

Related U.S. Application Data

(63) Continuation of application No. 16/908,494, filed on Jun. 22, 2020, now Pat. No. 11,526,388.

(51) Int. Cl.
| | |
|---|---|
| *G06F 11/00* | (2006.01) |
| *G06F 11/22* | (2006.01) |
| *G06N 5/04* | (2023.01) |
| *G06N 20/00* | (2019.01) |

(52) U.S. Cl.
CPC ........ *G06F 11/008* (2013.01); *G06F 11/2263* (2013.01); *G06N 5/04* (2013.01); *G06N 20/00* (2019.01)

(58) Field of Classification Search
CPC ............... G06F 11/008; G06F 11/2263; G06F 11/0751; G06F 11/3006; G06F 2201/01; G06N 20/00; G06N 5/04
See application file for complete search history.

(56) References Cited

U.S. PATENT DOCUMENTS

| | | |
|---|---|---|
| 6,650,896 B1 | 11/2003 | Haymes et al. |
| 6,931,387 B1 | 8/2005 | Wong et al. |
| 7,047,448 B2 | 5/2006 | Rao et al. |
| 7,440,932 B2 | 10/2008 | Gartland et al. |
| 7,830,547 B2 | 11/2010 | Kolb et al. |
| 8,239,252 B2 | 8/2012 | Wellman |
| 8,315,623 B1 | 11/2012 | Flynn et al. |
| 8,443,074 B2 | 5/2013 | Bahl et al. |
| 8,666,390 B2 | 3/2014 | Meredith et al. |

(Continued)

*Primary Examiner* — Jonathan D Gibson
(74) *Attorney, Agent, or Firm* — Perkins Coie LLP

(57) ABSTRACT

Disclosed here is a system to automatically predict and reduce hardware related outages. The system can obtain a performance indicator associated with a wireless telecommunication network including a system performance indicator or an application log, along with a machine learning model trained to predict and resolve a hardware error based on the performance indicator. The machine learning model can detect an anomaly associated with the performance indicator by detecting an infrequent occurrence in the performance indicator. The machine learning model can determine whether the anomaly is similar to a prior anomaly indicating a prior hardware error. Upon determining that the anomaly is similar to the prior hardware error, the machine learning model can predict an occurrence of the hardware error.

20 Claims, 15 Drawing Sheets

(56) References Cited

U.S. PATENT DOCUMENTS

| | | | |
|---|---|---|---|
| 8,958,771 B2 | 2/2015 | Flynn et al. | |
| 9,935,851 B2 | 4/2018 | Gandham et al. | |
| 10,063,406 B2 | 8/2018 | Tapia et al. | |
| 10,565,077 B2 | 2/2020 | Hayden et al. | |
| 10,756,990 B1 | 8/2020 | Chakkassery Vidyadharan et al. | |
| 11,271,796 B2 * | 3/2022 | Tapia | H04W 24/04 |
| 11,307,949 B2 * | 4/2022 | Almasan | G06F 11/3438 |
| 11,308,417 B2 * | 4/2022 | Vichare | G06F 11/3089 |
| 11,315,196 B1 | 4/2022 | Narayan et al. | |
| 11,442,803 B2 * | 9/2022 | Cherbakov | G06F 11/0742 |
| 11,526,388 B2 * | 12/2022 | Prakash | G06N 20/00 |
| 11,595,288 B2 | 2/2023 | Nguyen et al. | |
| 11,675,799 B2 * | 6/2023 | Pierri | G06F 11/3409 |
| | | | 714/37 |
| 11,734,097 B1 * | 8/2023 | Golden | G06F 11/079 |
| | | | 714/47.2 |
| 2002/0194319 A1 | 12/2002 | Ritche | |
| 2003/0110248 A1 | 6/2003 | Ritche | |
| 2004/0103412 A1 | 5/2004 | Rao et al. | |
| 2005/0075748 A1 | 4/2005 | Gartland et al. | |
| 2006/0003689 A1 | 1/2006 | Griffin et al. | |
| 2007/0027999 A1 | 2/2007 | Allen et al. | |
| 2007/0168758 A1 | 7/2007 | Kolb et al. | |
| 2008/0082600 A1 | 4/2008 | Meijer et al. | |
| 2008/0148231 A1 | 6/2008 | Weber | |
| 2008/0222287 A1 | 9/2008 | Bahl et al. | |
| 2012/0046982 A1 | 2/2012 | Wellman | |
| 2013/0053023 A1 | 2/2013 | Meredith et al. | |
| 2013/0064101 A1 | 3/2013 | Flynn et al. | |
| 2013/0219053 A1 | 8/2013 | Quade et al. | |
| 2014/0123228 A1 | 5/2014 | Brill et al. | |
| 2014/0304699 A1 | 10/2014 | He et al. | |
| 2015/0135012 A1 * | 5/2015 | Bhalla | G06N 20/00 |
| | | | 714/26 |
| 2016/0378628 A1 * | 12/2016 | Nguyen | G06F 11/008 |
| | | | 714/40 |
| 2017/0006135 A1 | 1/2017 | Siebel et al. | |
| 2017/0019315 A1 | 1/2017 | Tapia et al. | |
| 2017/0118092 A1 | 4/2017 | Dixon et al. | |
| 2017/0262818 A1 | 9/2017 | Horrell et al. | |
| 2017/0278007 A1 * | 9/2017 | Anchuri | G06F 11/3419 |
| 2017/0353991 A1 | 12/2017 | Tapia | |
| 2018/0174069 A1 | 6/2018 | Childress et al. | |
| 2019/0044825 A1 * | 2/2019 | Vijayakumar | G06F 11/008 |
| 2019/0068467 A1 * | 2/2019 | Chauhan | G06F 11/3452 |
| 2019/0087256 A1 * | 3/2019 | Horrell | G06F 11/0772 |
| 2019/0129779 A1 | 5/2019 | Adamson et al. | |
| 2019/0132191 A1 * | 5/2019 | Mann | G06F 11/30 |
| 2019/0149426 A1 | 5/2019 | Almasan et al. | |
| 2019/0163594 A1 | 5/2019 | Hayden et al. | |
| 2019/0164067 A1 | 5/2019 | Platini et al. | |
| 2019/0196938 A1 * | 6/2019 | Mathen | G06F 18/295 |
| 2019/0268214 A1 | 8/2019 | Maes et al. | |
| 2019/0347148 A1 | 11/2019 | Gomes Pereira et al. | |
| 2019/0394081 A1 * | 12/2019 | Tahhan | H04L 41/0894 |
| 2020/0057933 A1 * | 2/2020 | Cosgrove | H04L 63/1408 |
| 2020/0184355 A1 | 6/2020 | Mehta et al. | |
| 2020/0394462 A1 * | 12/2020 | Hild | G06F 11/0754 |
| 2021/0006453 A1 | 1/2021 | Dutta et al. | |
| 2021/0152416 A1 | 5/2021 | A et al. | |
| 2021/0165708 A1 * | 6/2021 | Vijayaraghavan | G06N 3/04 |
| 2021/0240683 A1 * | 8/2021 | McCain | G06N 20/20 |
| 2021/0243068 A1 | 8/2021 | R et al. | |
| 2021/0266228 A1 | 8/2021 | Reehil et al. | |
| 2021/0303378 A1 * | 9/2021 | Sethi | G06F 18/2178 |
| 2021/0304037 A1 * | 9/2021 | Penumarthi | H04L 63/1425 |
| 2021/0320936 A1 * | 10/2021 | Wright | H04L 63/1425 |
| 2021/0373985 A1 * | 12/2021 | Gadepalli | G06F 11/0793 |
| 2021/0383206 A1 * | 12/2021 | Teppoeva | G06F 11/004 |
| 2021/0397495 A1 * | 12/2021 | Prakash | G06F 11/008 |
| 2021/0399972 A1 | 12/2021 | Nguyen et al. | |
| 2022/0027257 A1 * | 1/2022 | Harutyunyan | G06N 5/01 |
| 2022/0051117 A1 | 2/2022 | Muto et al. | |
| 2022/0300364 A1 * | 9/2022 | Nagaraddi | G06F 11/0793 |
| 2022/0413951 A1 * | 12/2022 | Prakash | H04W 24/04 |
| 2023/0122653 A1 * | 4/2023 | Yoshida | G06F 11/0706 |
| | | | 714/37 |
| 2023/0164056 A1 * | 5/2023 | Nguyen | H04L 41/069 |
| | | | 709/224 |

* cited by examiner

PREDICTING AND REDUCING HARDWARE RELATED OUTAGES

CROSS-REFERENCE TO RELATED APPLICATIONS

This application is a continuation of U.S. patent application Ser. No. 16/908,494 filed Jun. 22, 2020, which is incorporated herein by reference in its entirety.

BACKGROUND

Computer networking enables creation of increasingly complex systems, such as telecommunication networks, that span the whole globe and include billions of devices capable of communicating with each other. Increasing complexity makes network behavior, and individual device behavior, unpredictable. Issues that arise in complex systems are difficult to pinpoint and resolve due to complex interdependencies, where an issue occurring in one device can propagate in unpredictable ways through a majority of the network.

DETAILED DESCRIPTION

Figure 1:
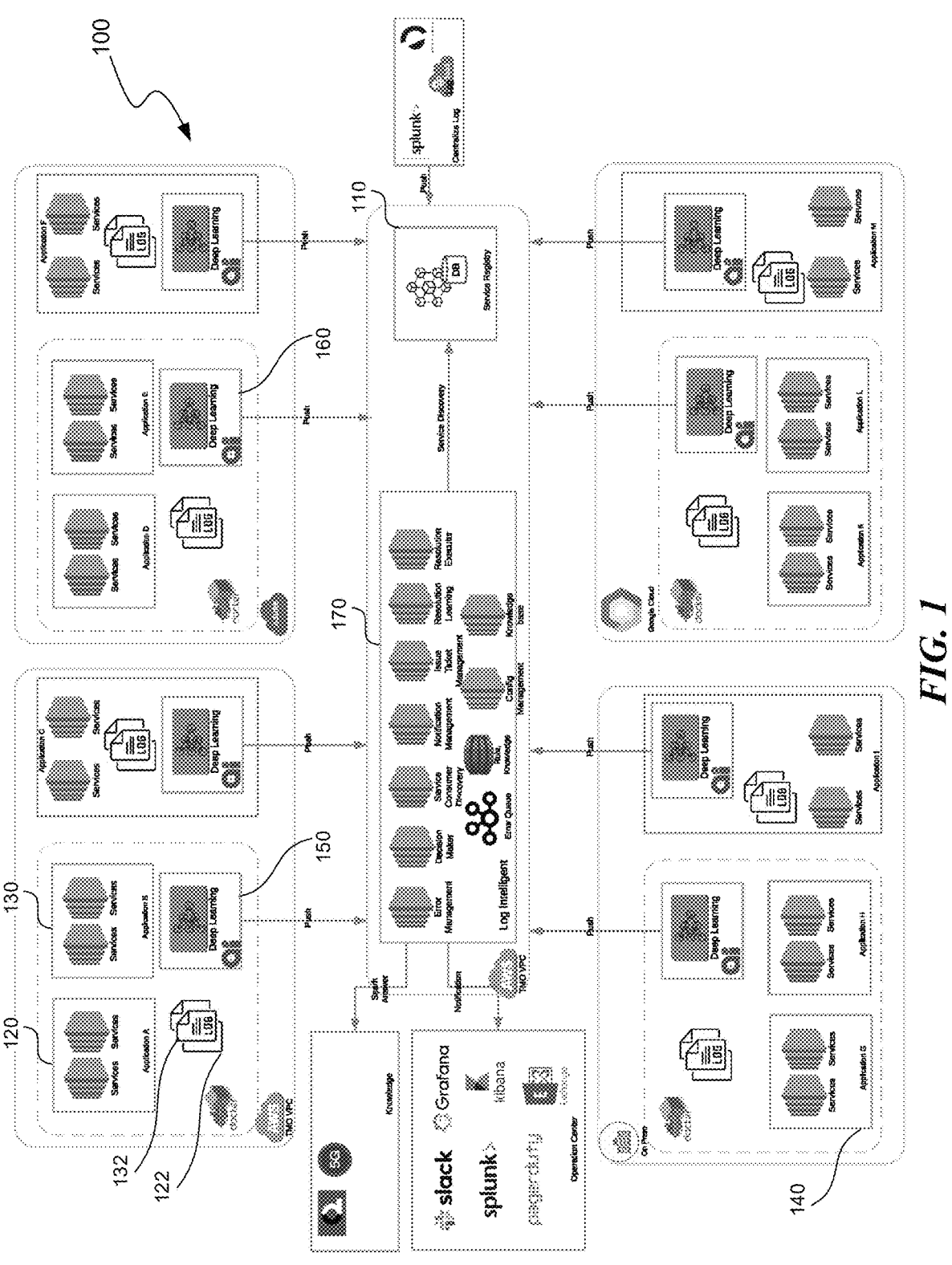
FIG. 1 shows a system to detect and resolve issues in multiple interdependent components of a wireless or communication network.

Disclosed here is a method to automatically predict and resolve a hardware error in a wireless telecommunication network. The hardware causing the error can be, for example, a load balancer. The processor executing the method obtains a performance indicator associated with the wireless telecommunication network such as a system performance indicator, e.g., a CPU load, or an application log associated with the hardware. The processor trains a machine learning model (ML) to predict and resolve the hardware error based on the performance indicator, before the error affects users. The ML detects an anomaly in the performance indicator by detecting an infrequent occurrence in the performance indicator, such as a high CPU load. The ML determines whether the anomaly is similar to a prior anomaly indicating a prior hardware error. Upon determining that the anomaly is similar to the prior hardware error, the ML can predict an occurrence of the hardware error, obtain a resolution to the prior hardware error from a database storing multiple issue tickets and multiple issue ticket resolutions, and can notify an administrator of the anomaly and the resolution.

To determine whether the anomaly is similar to the prior anomaly, the processor obtains a historical application log, historical system performance indicator, a historical record of prior hardware errors, the current application log, and the current system performance indicator. Based on the application log, the system performance indicator, the issue ticket, and the detection of the anomaly, the processor categorizes the anomaly into a category where the anomaly occurred, such as the application log or the system performance indicator. Based on the category, the processor matches the anomaly to the prior anomaly occurring in the same category by comparing a temporal window surrounding the anomaly to a prior temporal window surrounding the prior anomaly and calculating a difference between data points in the temporal window and data points in the prior temporal window. The difference can be calculated using least squares. When the difference is within a predetermined threshold, the processor determines that the anomaly and the prior anomaly are similar.

Also disclosed here is a system to automatically predict and resolve issues within a telecommunication network. Initially, the system builds a service registry to store dependence information within the network, which can include software components and hardware components. A software component can be an application running on a user's device, while a hardware component can be a server computer, a cell phone, a cell tower, a router, a switch, a gateway, an access point, etc. The software and hardware components can depend on each other. For example, an application can depend on a functioning of the hardware component such as a user's mobile device, and can depend on the functioning of a nearby cell tower. The service registry is represented as a directed graph network where a node denotes various components, while the edges between the nodes denote dependencies.

Various components of the network create logs of their operations. The logs can include errors, informational events, and warnings. Machine learning models examine the logs and detect any errors. Upon detecting an error or abnormal event, machine learning models can determine whether the error is a network issue or an issue associated with a device using the network. Upon determining that the issue is associated with the network, the system can determine whether the error is recurring. If the error is recurring, the system can automatically resolve the issue by determining the most similar issue occurring previously and determining a solution that resolved the previous most similar issue. In addition, the system can propagate the fix to dependent components and/or notify the dependent components of the issue.

Predicting and Resolving Issues within a Telecommunication Network

FIG. 1 shows a system to detect and resolve issues in multiple interdependent components of a wireless or communication network. The system 100 tasks can be separated into three categories: data gathering, issue detection, and resolution.

First, the system 100 gathers data across various telecommunication network components to build a service registry 110. The service registry 110 contains information about dependencies between various system components 120, 130, 140 (only three labeled for brevity). The service registry 110 can be represented as a directed graph, where the nodes are the components of a telecommunication network and the directed edges indicate dependencies between the components. For example, the service registry 110 can indicate that the components 120 and 130 are related, and that their logs 122, 132 should be examined together. In addition, the service registry 110 can indicate that the component 130 depends on component 120. Consequently, if the component 120 has an issue, component 130 will likely be affected.

Using the service registry 110, the system 100 can notify the component 130 that an issue is likely to arise in the near future, before the component 130 experiences the issue. For example, the telemetry of the component 130 can indicate that component 130 is operating without problems; however, the service registry 110 can help notify the component 130 of the impending issue before the telemetry of the component 130 detects the issue. Further, the system 100 can notify system administrators, and users of the upcoming issue prior to the issue occurring. The system 100 can create a visualization of the service registry, as shown in FIG. 1, by grouping interdependent components, such as component 120, 130, together. Further, the system 100 can visualize the issues, and how the issues are likely to propagate across the whole system 100.

In one embodiment, to build the service registry 110, a processor supporting at least a part of the system 100 can monitor communication between various parts of the system such as components 120, 130, 140. Based on the direct and indirect communication channels, the processor can build the service registry 110. For example, if the two components 120, 130 communicate directly with each other, the service registry 110 can record dependency between components 120, 130. Even if two components 120, 140 communicate indirectly with each other, via an intermediary, the service registry 110 can record dependency between components 120, 140.

In another embodiment, to build the service registry 110, a machine learning model can examine prior problems that the system 100 has experienced and that have been logged through issue tickets and an internal database. Further, the machine learning model can examine internal documentation such as wiki pages and training documents that explain relations between various system components.

For example, if a central piece of wireless telecommunication network infrastructure has been damaged, such as a main network cable has been cut, a large number of users, possibly all users in a large portion of the country, can lose connectivity. As a result, a telemetry system can alert network engineering that there is a problem within the part of the network served by the main cable. A side effect of the damage is an influx of users from a specific region of the country contacting customer care, an influx of users navigating to the wireless telecommunication network website to determine if they can self-serve or self-troubleshoot the issue. Additionally, issue tickets are created and stored in the internal database describing the problems experienced by the users, and internal wiki documentation is created describing the issue and how to address it. Pages relevant to solving the problem are viewed more frequently. Network bridges to circumvent the damaged main network cable can be set up. The internal database can store the pages that were viewed frequently when the problem occurred and network bridges that have been set up to solve the problem as a part of an issue ticket's resolution.

The machine learning model, such as a supervised or an unsupervised machine learning model, can correlate the events such as the main network cable problem, the telemetry problems that have been identified within a time window prior to solving the main network cable problem, the problems experienced by the users calling customer support as well as users accessing the wireless telecommunication network website, and/or the issue tickets. From this data, the machine learning model can conclude that the components that have had problems after the occurrence of the main network cable problem and prior to the solution of the main network cable problem, depend on the network cable. Based on that dependency, the machine learning model can create the service registry 110.

Second, the system 100 detects an issue, for example, an anomaly, which indicates problematic behavior. To detect the issue, machine learning model 150, 160 (only two labeled for brevity) monitors the logs 122, 132 of the components 120, 130. The log can include an informational event, a warning, and an error. The system 100 determines whether the error in the log is repeating, and if the error in the log is repeating, the system detects the issue. Once the machine learning model 150, 160 detects the issue, the machine learning model 150, 160 notifies machine learning model 170 of the problem.

In one embodiment, to determine whether the issue is caused by the system 100 or the user device, the system 100 can examine how many user devices are experiencing the issue, and if many user devices are experiencing the issue, the system can determine that the issue is caused by a component. To determine whether many user devices are experiencing the issue, the system can calculate the percentage of user devices of the problematic component that are experiencing the issue. If, for example, 30% of the user devices using the problematic component are experiencing the issue, then the system 100 can determine that the issue is caused by the component.

In another embodiment, the system 100 can obtain historical records from the database containing prior issues associated with the system 100, and based on the records can determine whether the issue is with the component or with the user's device. For example, if prior records indicate that the issue was a system issue, then likely the current issue is a system issue. Conversely, if prior records indicate that the issue was a device issue, then likely the current issue is a device issue.

Third, the machine learning model 170 suggests a solution. For example, if the main network cable has been cut, as described above, the machine learning model 170 can analyze the internal documentation that has been frequently viewed when the network cable has been cut, and/or the solutions that have been created, such as the network bridges and/or rebooting. As a result, the next time the main network cable has a similar, but not necessarily the same, issue, such as low throughput, the machine learning model 170 can identify potential solutions such as a network bridge. The machine learning model 170 can notify system engineers of the current problem, for example, low throughput on the main network cable, by triggering a Webex call to the engineers. The machine learning model 170 can automatically generate a document that is presented to customers when they log onto the website, and/or generate internal Wikipedia documentation on how to solve the problem.

The ability of the system 100 to automatically predict problems prior to their occurrence, and to automatically resolve the problems, enables efficient expansion and upgrades to the wireless telecommunication network. For example, upgrading the wireless telecommunication network to the 5G grid can be faster and cheaper because the system 100 can quickly detect and respond to faults on the telecommunication network. Further, the system 100 can avoid overload, ensure system reliability, and ensure extensive message signaling between all the interdependent components within the system 100.

Figure 2:
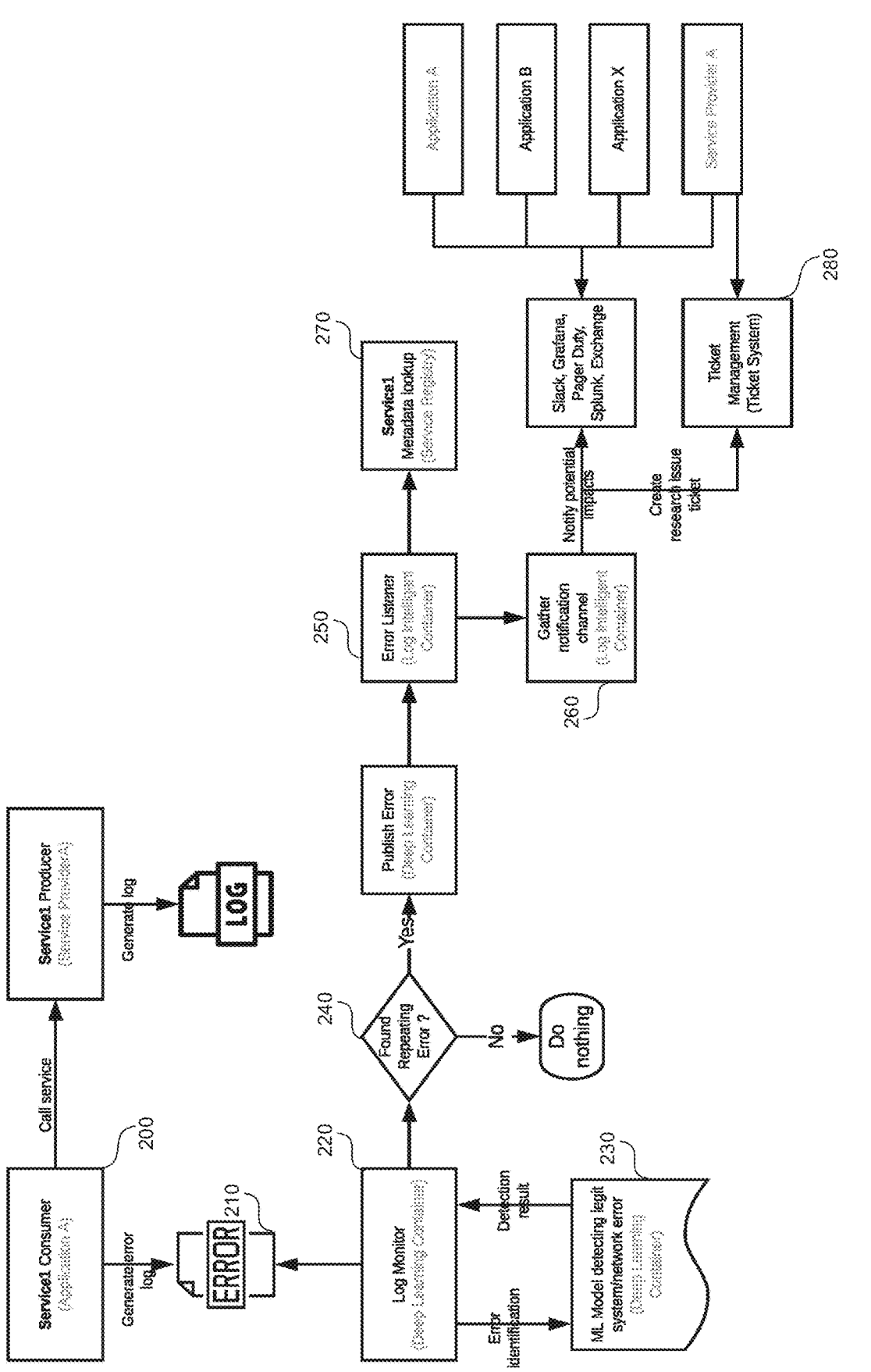
FIG. 2 is a flowchart of a method to automatically detect issues.

FIG. 2 is a flowchart of a method to automatically detect issues. A hardware or software processor can execute instructions associated with various modules and/or steps 200, 220, 230, 240 shown in FIG. 2.

A wireless telecommunication network component 200 can generate a log 210 containing errors occurring during the operation of the component 200. The component 200 can be a software application running within the wireless telecommunication network, or it can be a hardware component such as a router, a server, a sector, an antenna, a tower, etc. A log monitor 220 can monitor the contents of the log 210. The entries can be errors, informational events, and warnings. When new entries appear in the log 210, the log monitor 220 can forward the new entries to the machine learning model 230 which can determine whether the issue is related to the wireless telecommunication network. The rest of unrelated errors are ignored.

To determine whether the issue is related to the wireless telecommunication network, the machine learning model 230 can examine how many user devices are affected by the issue, and if a significant percentage of the user devices are affected by the issue, then the issue is likely related to the wireless telecommunication network, as opposed to being related to the user devices. In addition to, or alternatively, the machine learning model 230 can examine if the issue is similar to previously reported issues, and if a similar issue is found, whether the prior issue was caused by a wireless telecommunication network component. If a similar issue was caused by the wireless telecommunication network component, then the current issue is likely caused by the wireless communication component.

The machine learning model 230 passes the result of the determination to the log monitor 220. If the issue is caused by the wireless telecommunication network component, the processor in step 240 determines whether the issue is repeating. If the issue is a one-time issue, the processor doesn't do anything. If the issue is repeating, the error listener 250 monitors how frequently the error is occurring, and if the frequency of occurrence is above a predetermined threshold. For example, if the error is occurring one time a day, the error listener 250 does not take any action; however, if the error is occurring five times a day, the error listener 250 determines that the issue should be fixed.

Once the error listener 250 determines that the issue should be fixed, the error listener 250 can determine which systems are impacted by the issue using the service registry 110 in FIG. 1. The processor in step 260 can obtain the components impacted by the issue from the error listener 250 and can determine who to notify using which notification channel, such as Webex, SMS, pager, email, etc. Similarly, the processor in step 270 can determine which user devices are affected by the issue and can notify the users of those devices of the issue. The processor can identify the relationship of the impacted components to other parts of the larger system. Finally, in step 280, the processor can create an issue ticket describing the issue and the impacted components. The processor can store the issue, the impacted components and/or the solution to the issue in a database for future reference, such as using the issue and the issue resolution for future reinforcement training of a machine learning model.

Figure 3:
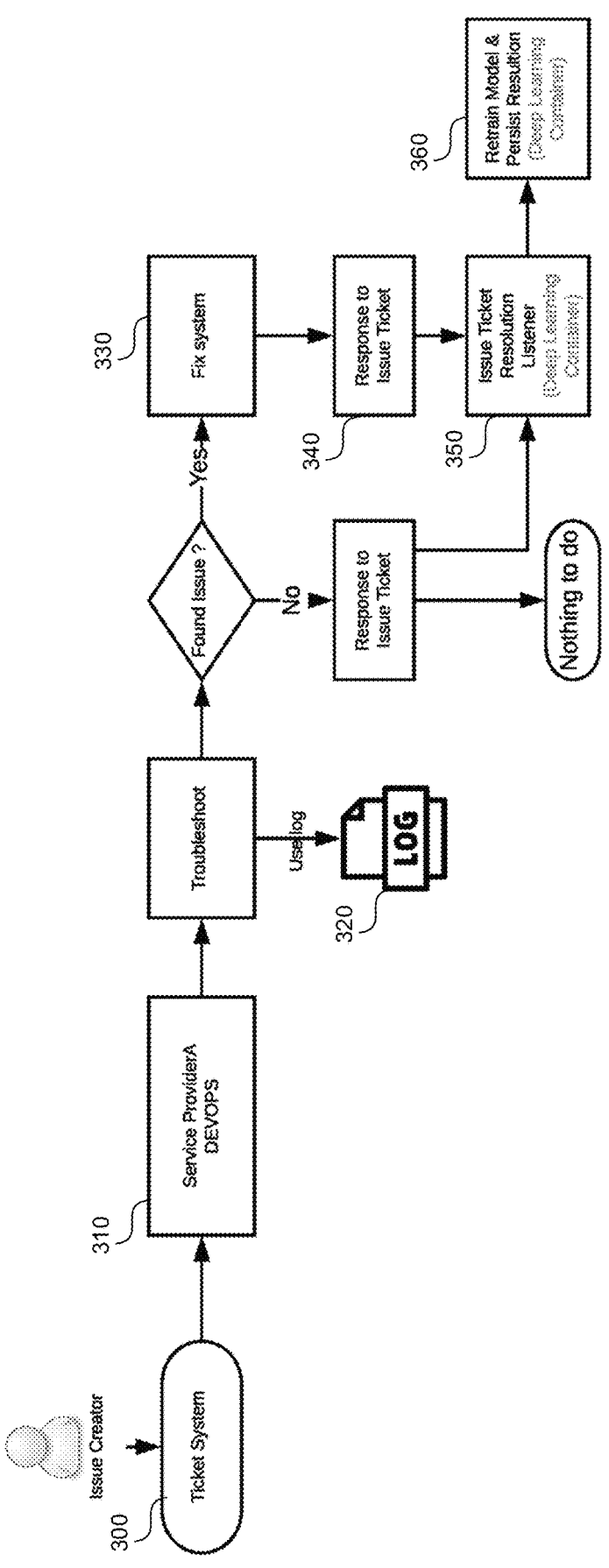
FIG. 3 is a flowchart of a method to generate data used in training a machine learning model to resolve an issue.

FIG. 3 is a flowchart of a method to generate data used in training a machine learning model to resolve an issue. In step 300, an initial creator, such as a user or a processor, creates an issue ticket, which is stored in a database, and describes the issue that needs to be resolved. The issue can include a slow access to a service running on a remote device. For example, normally the service takes about 5 seconds or less to respond, but when the service takes more than 10 seconds to respond, the slow response is indicative of an issue, and the issue ticket can be created to address the issue. The issue can include a slow response of an application running on a mobile device, frequent crashes of the application, etc.

In step 310, an engineer, or the processor running, for example, an expert system, can troubleshoot the issue. For example, if the access to the service running on the remote device is slow, the network connection between the local device and the remote service can be slow. If the application running on the local device is slow, or if it frequently crashes, the CPU of the local device can be overloaded, the memory of the local device can be overloaded, the application can have a bug that needs to be resolved, etc.

The solution, if the CPU load is high or the memory use is high, can be to restart the system. The solution to the slow network can be to spawn additional daemons to listen to network ports.

The processor, in step 310, can record the steps taken during troubleshooting and record them in the log 320 because the log can contain useful information for the next time when a similar issue occurs.

In step 330, if the issue and solution have been found, the processor implements the fix to the system. In step 340, the processor records the solution to the issue as an issue ticket resolution. Both of the issue ticket and the issue ticket resolution are stored in the database.

The database storing the issue tickets and issue ticket resolutions can be used to train a machine learning model 170 in FIG. 1 that can determine a resolution to an issue detected in the wireless telecommunication network. For example, the machine learning model 170 can receive an issue ticket as input and produce an issue ticket resolution as output. When the output issue ticket resolution matches the issue ticket resolution stored in the database, the machine learning model 170 receives a positive feedback, and when they do not match, the machine learning model 170 receives a negative feedback. Once trained, the machine learning model 170 can be deployed.

Even when the machine learning model 170 is deployed, in step 350, an issue ticket resolution listener can monitor the issue ticket resolutions coming into the database, and can determine which issue ticket resolutions are new. If a new issue ticket resolution occurs, the issue ticket resolution listener can pass the new issue ticket and the new issue ticket resolution to the machine learning model 170 for further training in step 360. This reinforcement learning process can help improve the accuracy and confidence level of the machine learning model 170 to automatically detect and resolve the issues without human intervention. The newly trained model can be deployed in a production environment to detect and resolve production issues.

Once trained, the machine learning model 170 receives a current issue, and identifies prior issues that are similar to the current issue. The machine learning model can identify a qualitative issue associated with the current issue, such as a category to which the current issue belongs. For example, the category can be network bandwidth, memory usage, CPU load. To identify a similar prior issue, the machine learning model 170 can first identify the prior issues having the same qualitative issue as the current issue. Once the prior issues having the same qualitative issue have been identified, the machine learning model 170 can examine how well the quantitative data of the prior issue matches the quantitative data of the current issue.

For example, if the qualitative issue of the current issue and the prior issues is high CPU load, the processor can examine qualitative data associated with the issues. The qualitative data can include percentage of the CPU load, such as whether it is 40, 60, 90, 100% of the total CPU load. All the prior issues having the same qualitative issue and having similar quantitative data can be deemed to be similar to the current issue. For example, if the current issue shows a 90% CPU load, all of the prior issues having CPU load between 63% and 100% can be considered similar to the current issue. Consequently, the machine learning model 170 can suggest one or more of the prior solutions as a solution to the current issue.

Figure 4:
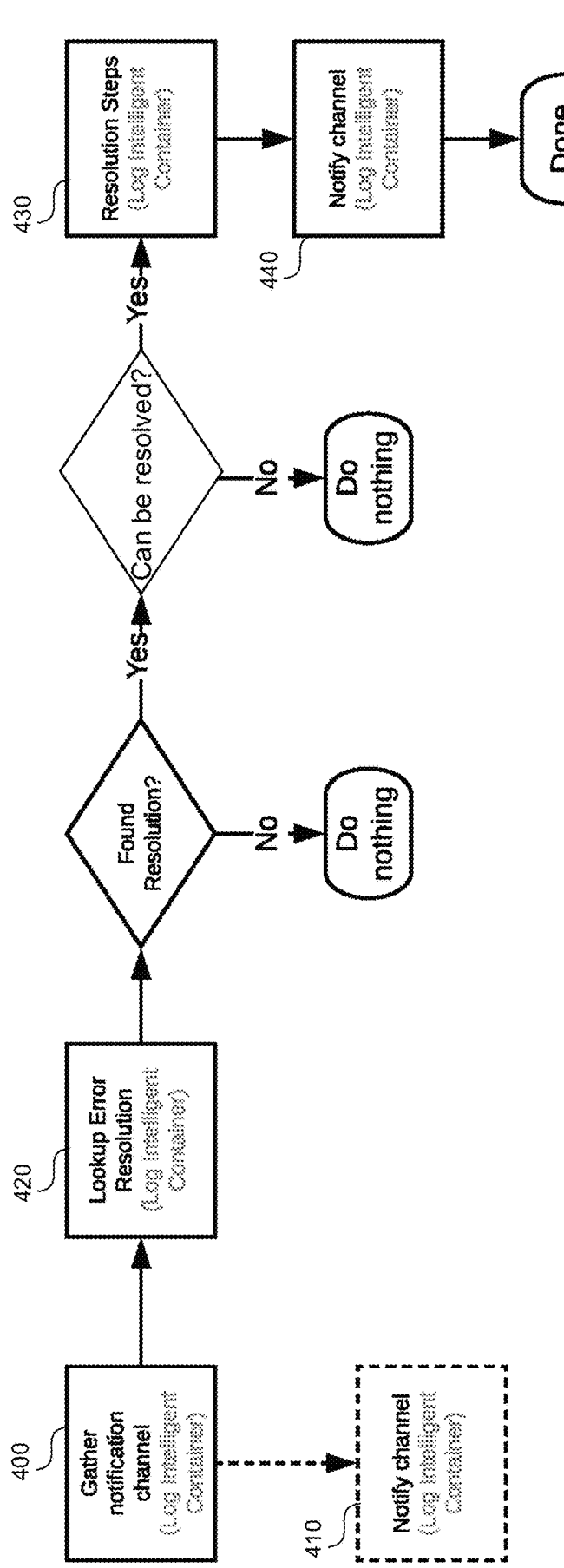
FIG. 4 is a flowchart of a machine learning model resolving an issue.

FIG. 4 is a flowchart of a machine learning model resolving an issue. In step 400, machine learning model 170 in FIG. 1 can receive a notification of an issue through a notification channel 410. The machine learning model, in step 420, can determine the next best action in resolving the current issue by identifying prior similar issues and their resolutions, as described in this application. If the resolution has been found, and the issue can be resolved, in step 430, a processor associated with the machine learning model 170 can obtain and/or propose the resolution steps. In step 440, the processor can notify other parts of the system 100 in FIG. 1, through a preferred resolution channel of the resolution steps. For example, the processor can create an issue ticket of the current problem, create the issue ticket resolution, and store the issue ticket and the issue ticket resolution in the database.

Figure 5:
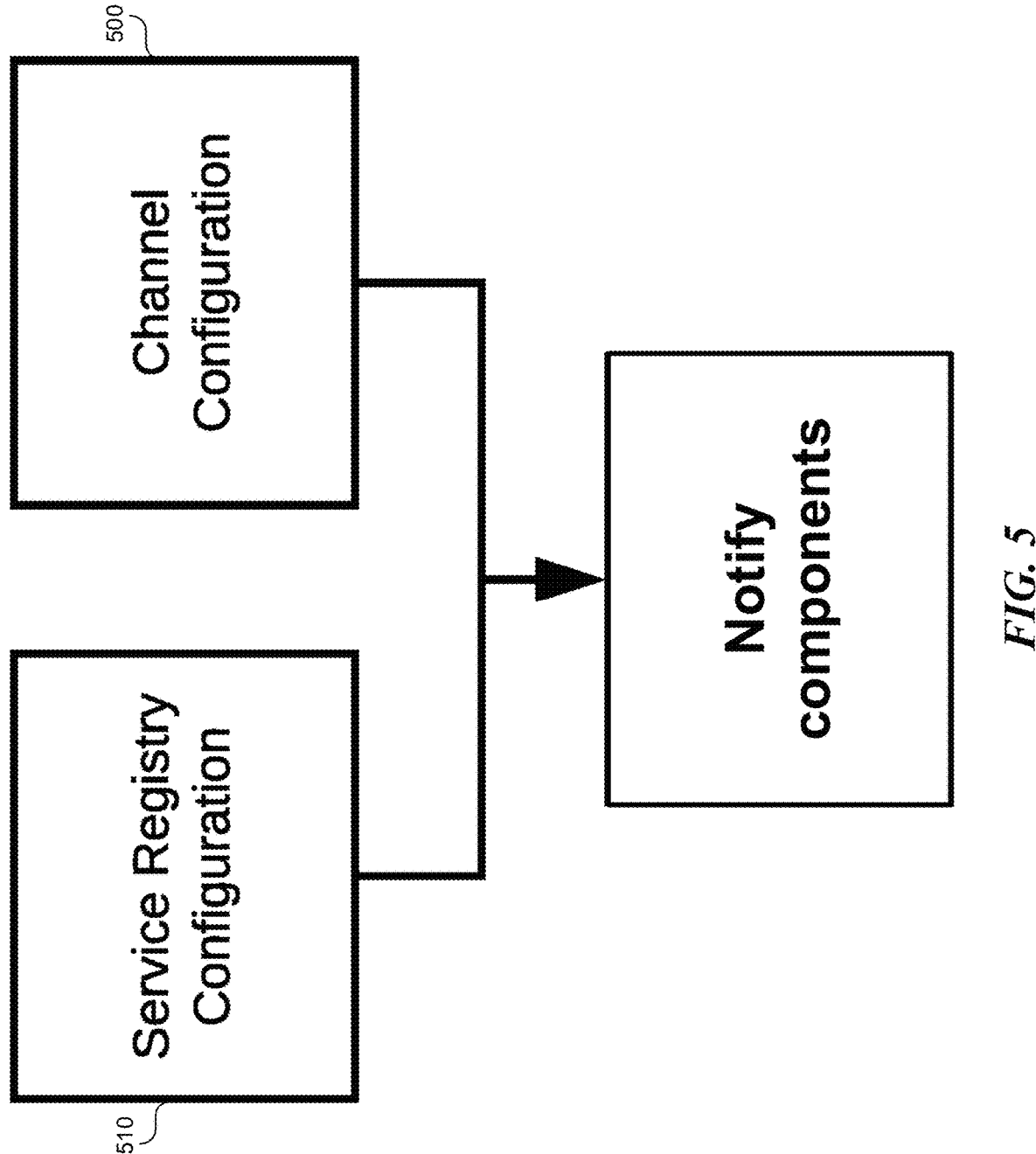
FIG. 5 shows how channels carrying notifications are configured.

FIG. 5 shows how channels carrying notifications are configured. Various components 120, 130, 140, 150, 160, 170 in FIG. 1 of the system 100 in FIG. 1 and their administrators can be notified differently of issues. For example, some components administrators prefer to be notified over email, text messages, a Webex call, pagers, Slack, etc. The preferences for notification channels are stored in a channel configuration database 500. When an issue arises, the processor can determine the components that need to be notified using the service registry 510 and can notify the components using the appropriate channel by referencing the channel configuration database 500.

Figure 6:
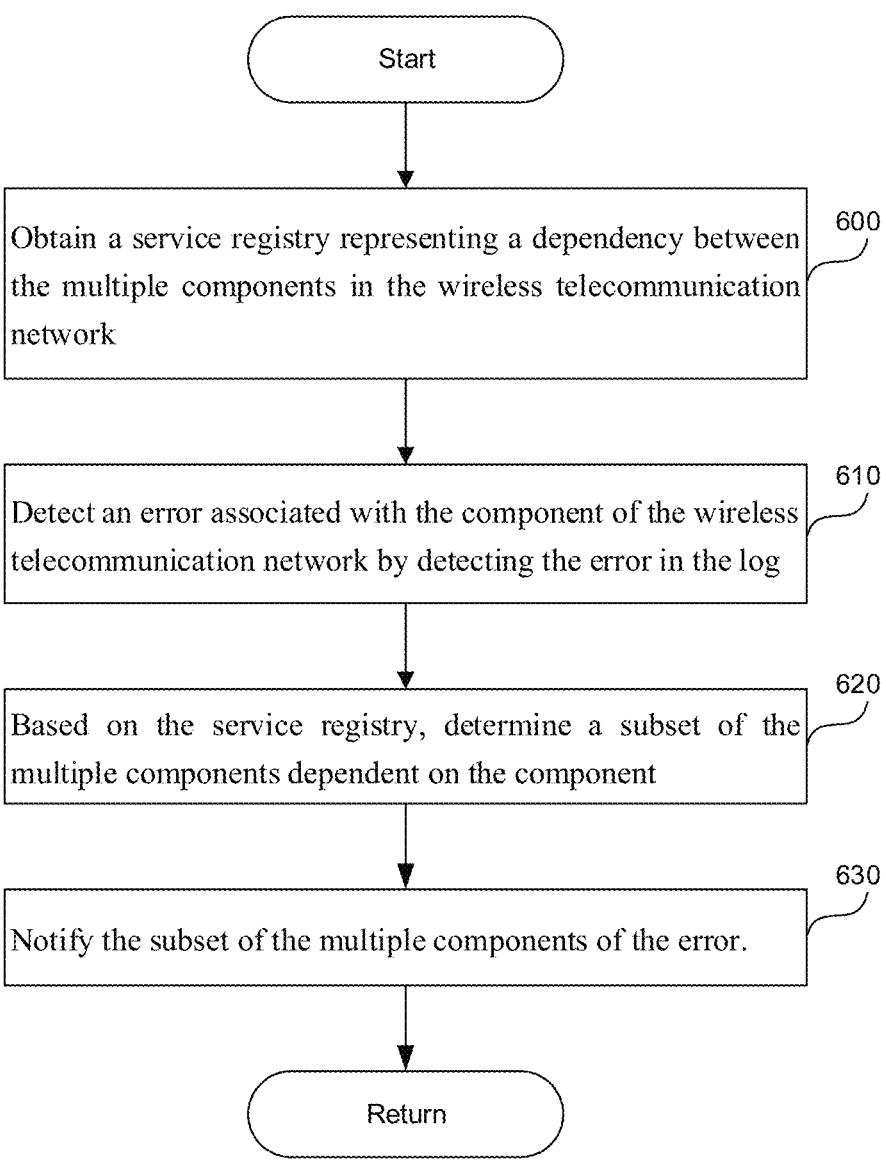
FIG. 6 is a flowchart of a method to automatically predict and resolve an issue in a wireless telecommunication network comprising multiple components.

FIG. 6 is a flowchart of a method to automatically predict and resolve an issue in a wireless telecommunication network comprising multiple components. In step 600, a processor can obtain a service registry representing a dependency between the multiple components in the wireless telecommunication network and can obtain a log of a component of the wireless telecommunication network. The log can include multiple events including an informational event, a warning, and an error.

In one embodiment, the processor can build the service registry by obtaining from a database a historical record of prior issues including multiple issue tickets and multiple issue ticket resolutions. The processor can analyze the multiple issue tickets and the multiple issue ticket resolutions. Based on the analysis, the processor can determine a subset of related issue tickets, and a subset of components affected by the related issue tickets. The processor can create the service registry by creating a dependency among the subset of components based on the subset of related issue tickets and the subset of components affected by the related issue tickets.

In another embodiment, the processor can monitor direct and indirect communication channels between two or more components of the wireless telecommunication network and create a dependency between the two or more components of the wireless telecommunication network in the service registry, when the two or more components of the wireless telecommunication network are in direct or indirect communication with each other. For example, if the communication is always from the first component to the second component, the dependency in the service registry can be represented as a directed edge between the first component and the second component. If the communication is bidirectional, the dependency in the service registry can be represented as a bidirectional or undirected edge. The direction of the edge can represent the direction of the dependency. For example, an edge pointing from a node A to a node B indicates that the node A depends on the node B.

In step 610, the processor can detect an issue associated with the component of the wireless telecommunication network by detecting the error in the log, determining that the error in the log is repeating, and determining that the issue is likely caused by the component of the wireless telecommunication network. Once the processor determines that the error is repeating, the processor can determine the frequency of the error, and compare the frequency of the error to a predetermined threshold, such as five times a day, ten times an hour, once a second, etc. When the frequency of the error is above the predetermined threshold, the processor can detect the issue. If the frequency of the error is below the predetermined threshold, the processor may not detect the issue, because the error is not sufficiently frequent to require fixing.

In one embodiment, to determine that the issue is likely caused by the component of the wireless telecommunication network, the processor can obtain information about multiple devices associated with multiple users of the wireless telecommunication network, where the multiple devices are in communication with the component of the wireless telecommunication network. The processor can determine a number of devices among the multiple devices related to the error in the log. For example, the multiple devices can be causing the error in the log, can be affected by the error in the log, and/or can be contributing to the occurrence of the error. When the number of devices exceeds a predetermined threshold, the processor determines that the issue is likely caused by the component of the wireless telecommunication network.

In another embodiment, to determine that the issue is likely caused by the component of the wireless telecommunication network, the processor can obtain from a database a historical record of prior issues comprising multiple issue tickets and multiple issue ticket resolutions. The processor can identify in the historical record a prior issue among the multiple issue tickets most similar to the issue. The processor can obtain from the database information whether the prior issue was caused by a device associated with the user of the wireless telecommunication network. Upon determining that the prior issue was not caused by the device associated with the user of the wireless telecommunication network, the processor can determine that the issue is likely caused by the component of the wireless telecommunication network.

In step 620, based on the service registry, the processor can determine a subset of the multiple components dependent on the component of the wireless telecommunication network. In step 630, the processor can notify the subset of the multiple components of the issue associated with the component, using the preferred notification channel, such as text, email, call, pager, etc., as described in FIG. 5.

The processor can automatically resolve the issue associated with the component by determining a prior issue similar to the issue, obtaining a solution to the prior issue, and applying the solution to the issue. To determine the prior issue similar to the issue, the processor can obtain from a database a historical record of prior issues including multiple issue tickets and multiple issue ticket resolutions. The processor can train a machine learning model to identify similar issues based on the multiple issue tickets and multiple issue ticket resolutions, as described in this application. Based on the issue and using the machine learning model, the processor can identify the prior issue similar to the issue.

To determine the similarity, the processor can identify a first qualitative issue associated with the issue and the second qualitative issue associated with the prior issue. The qualitative issue can include network speed, CPU load, memory consumption, application crashes, dropped phone calls, security vulnerabilities, etc. The processor can obtain a first quantitative amount associated with the first qualitative issue and a second quantitative amount associated with the second qualitative issue and the prior issue. The first and the second quantitative amount can be a number indicating, for example, 30% reduction in network speed, 40% higher CPU load, megabytes or gigabytes of memory consumption, frequency of application crashes, number of dropped phone calls, etc. The processor can determine that the prior issue is similar to the issue when the first quantitative amount and the second quantitative amount are within a predetermined range of each other. The predetermined range can vary between ±50%.

For example, the processor can utilize the system described in this application to detect a security vulnerability by detecting an action on behalf of a user at a first location when the user is at a second location, where the first location and the second location are different from each other by more than a predetermined amount, such as 50 m. The processor can notify, using the service registry, the user and the components of the wireless telecommunication network affected by the security vulnerability.

Predicting and Reducing Hardware Related Outages

Figure 7:
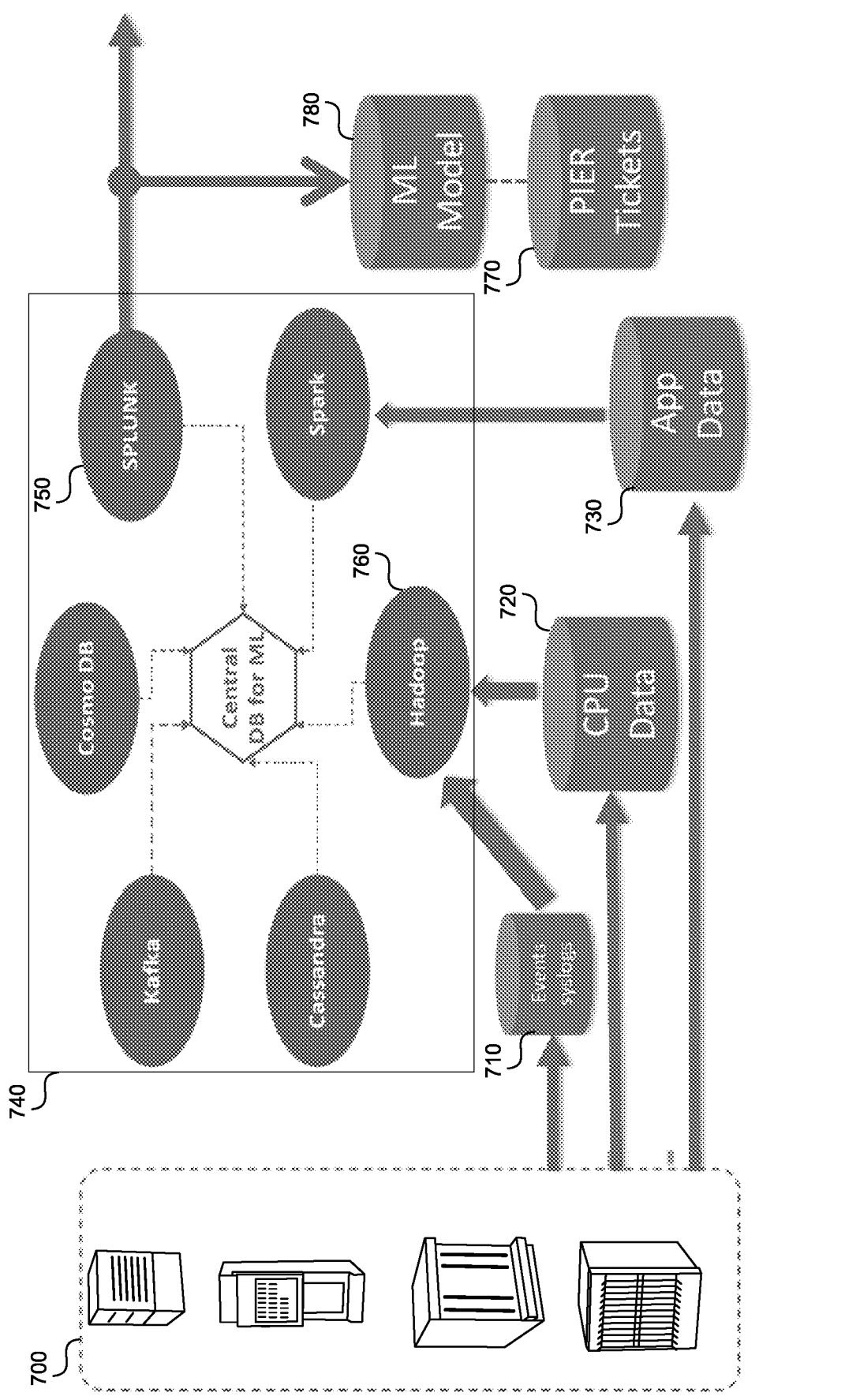
FIG. 7 shows a system to predict and resolve a hardware error in a wireless telecommunication network.

FIG. 7 shows a system to predict and resolve a hardware error in a wireless telecommunication network. The wireless telecommunication network 700 can include various components such as servers, routers, cell towers, sectors, antennas, software applications, etc., which can record events, warnings, and errors in various logs. The logs can include an event system log 710, CPU data 720, application data 730, etc. The system log 710 can include performance information such as CPU data 720, memory usage, hard drive usage, GPU usage, ethernet traffic indicator, applications currently running, etc. The system log 710 can include events, warnings, and/or errors associated with the operating system. The application data 730 can include events, warnings, and/or errors associated with the application.

A hardware or software processor associated with the wireless telecommunication network 700 can gather the logs 710, 720, 730 from the various components of the wireless telecommunication network and can store the logs in a database 740. The database 740 can include multiple individual databases such as Splunk 750, Hadoop 760, and others as seen in FIG. 7.

Database 770 can include issue tickets and issue ticket resolutions associated with the wireless telecommunication network 700. For example, if there is a problem with the wireless telecommunication network 700, such as multiple users cannot complete their phone calls, the processor can create the issue ticket describing the problem. Once the resolution to the problem has been determined, the processor can record the issue ticket resolution describing the solution to the problem. The processor can store both the issue ticket in the issue ticket resolution in the database 770.

Machine learning model 780 can use the data from the database 740 for training. For example, the machine learning model 780 can take as input data from the database 740 and data from the database 770, and then it can correlate the logs from the database 740 with the issue ticket from the database 770 to determine what kind of patterns, e.g., anomalies, occurring in the logs are associated with issue tickets. The next time the machine learning model receives the logs containing similar patterns associated with an issue ticket, the machine learning model 780 can predict that a problem will occur, prior to the issue ticket generation.

Figure 8:
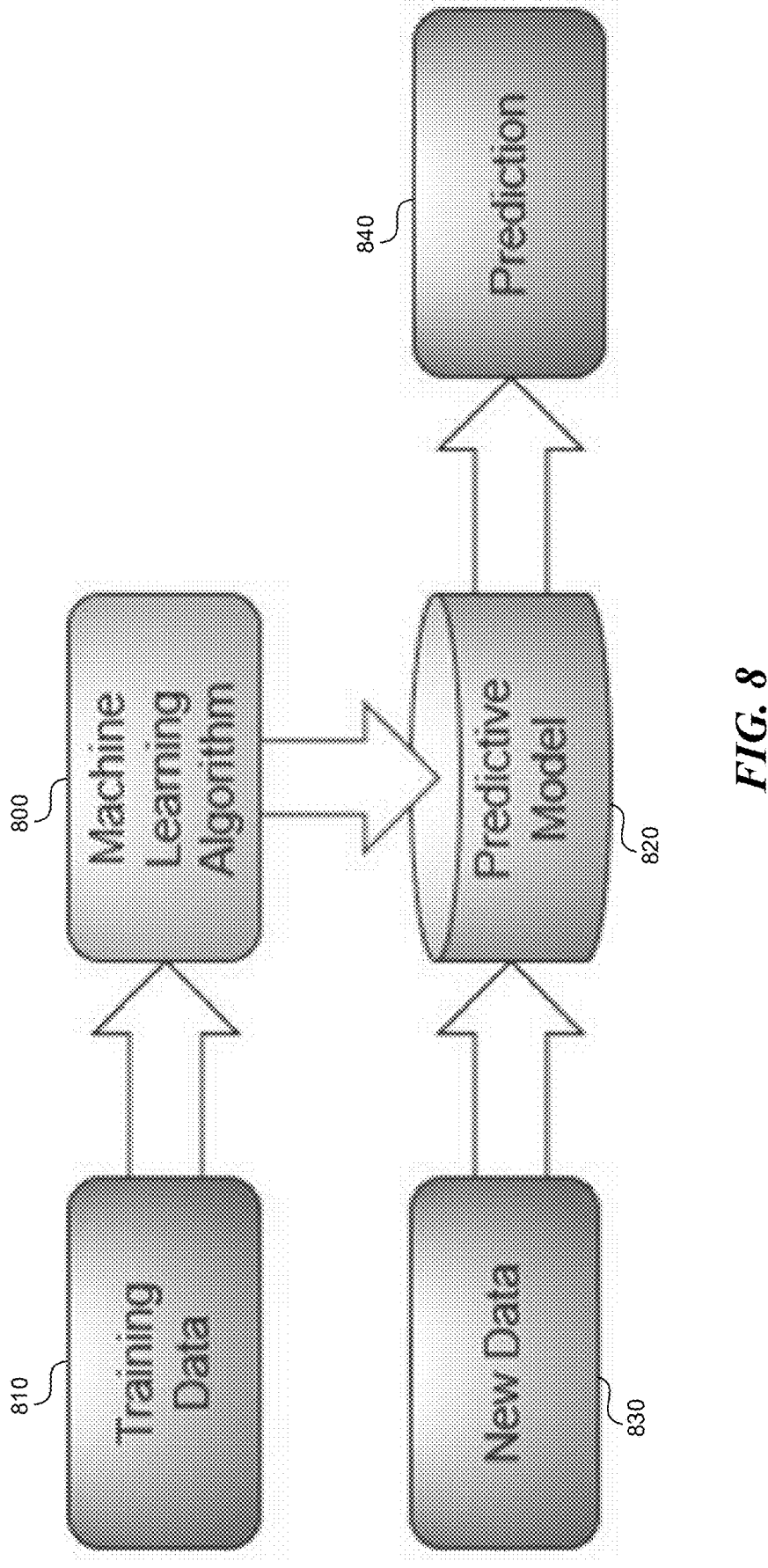
FIG. 8 shows training and deployment of a machine learning model.

FIG. 8 shows training and deployment of a machine learning model. A processor can train the machine learning model 800 using data 810, which can include historical data 710, 720, 730 in FIG. 7, historical events such as issue tickets and issue ticket resolutions stored in the database 770 in FIG. 7, historical predictions, and historical results. Historical predictions can include attempted solutions to an issue. Historical results can include whether the attempted solutions were successful or not. The attempted solutions and the success of the attempted solutions can be stored in issue tickets and issue ticket resolutions.

Once the training is completed, the machine learning model 800 can be deployed as a machine learning model 820, e.g., a predictive model. The machine learning model 820 can take in new data 830, which can include streamed device data, streamed application data, and/or streamed events. The processor can obtain the streamed device data from current system logs or device logs, streamed application data from current application logs, and streamed events from currently open issue tickets.

Based on the new data 830, the machine learning model 820 can make a prediction 840 whether a hardware-related error is likely to occur. The prediction 840 can include information about the predicted outage such as the component, an estimated time when the predicted outage is likely to occur, and a confidence factor, indicating how likely the predicted outage is.

Figure 9:
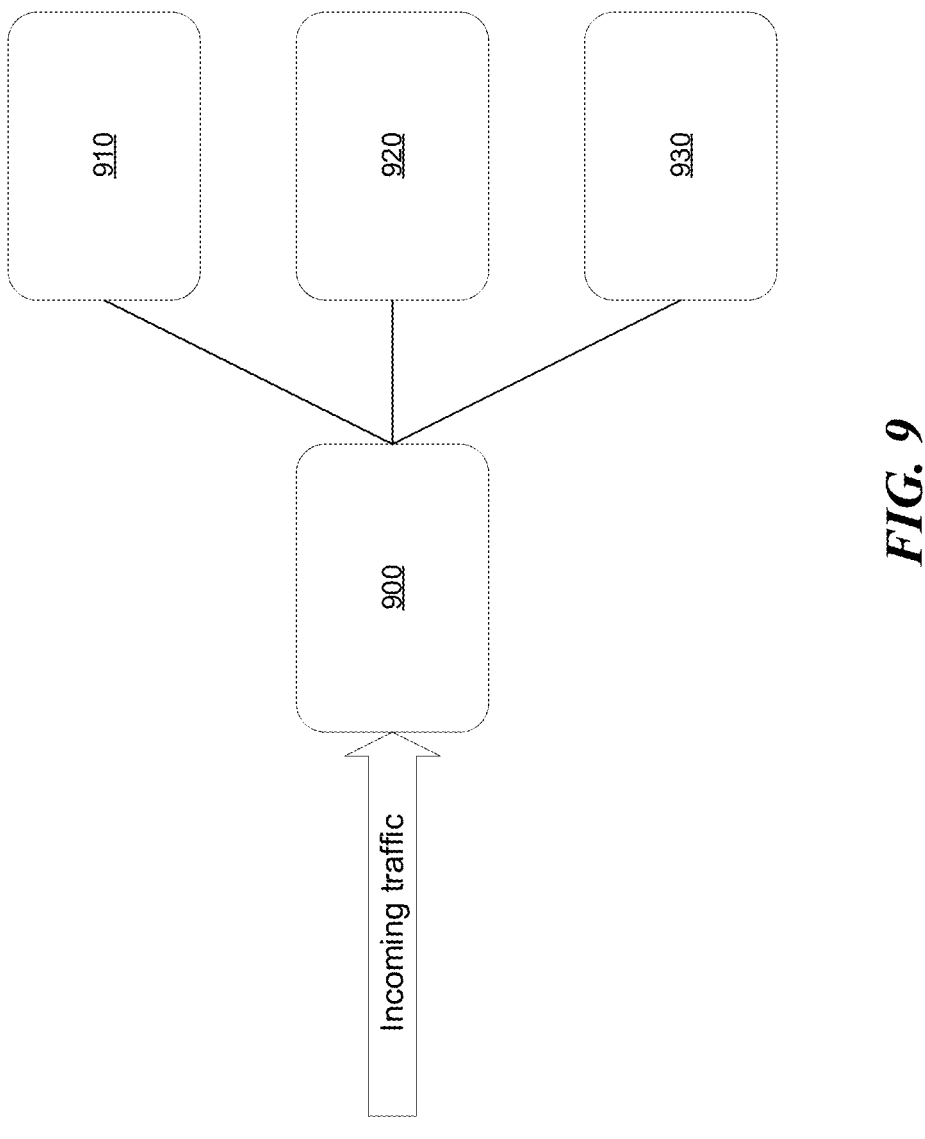
FIG. 9 shows an example of hardware that can have broad impact upon failure.

FIG. 9 shows an example of hardware that can have broad impact upon failure. The hardware 900 can be a load balancer balancing incoming Internet traffic among multiple servers 910, 920, 930, and/or balancing incoming calls among multiple cell towers. A failure in the load balancer 900 can cause a failure among the multiple servers 910, 920, 930. Thus, keeping the load balancer 900 properly functioning is highly important.

For example, a company's website, such as T-Mobile.com can be hosted on multiple servers 910, 920, 930. The traffic between the multiple servers 910, 920, 930 can be distributed among the servers based on the capacity of the servers and based on the number of users. Sometimes a server cannot handle all the traffic that visits, so a load balancer 900 is placed between the incoming traffic and the servers 910, 920, 930 to distribute and balance the incoming traffic among the multiple servers 910, 920, 930.

To predict a failure of the load balancer 900, a processor can monitor the load balancer 900 system log including CPU load, memory usage, and/or application log. Upon detecting patterns in the system log and/or the application log that previously occurred prior to a load balancer 900 outage, the processor can predict an upcoming failure of the load balancer 900. By notifying system administrators and/or by automatically determining the solution to the upcoming failure, the processor can prevent the load balancer 900 from failing, or it can reduce the time between the failure and recovery of the load balancer, thus reducing the number of users affected.

Figure 10:
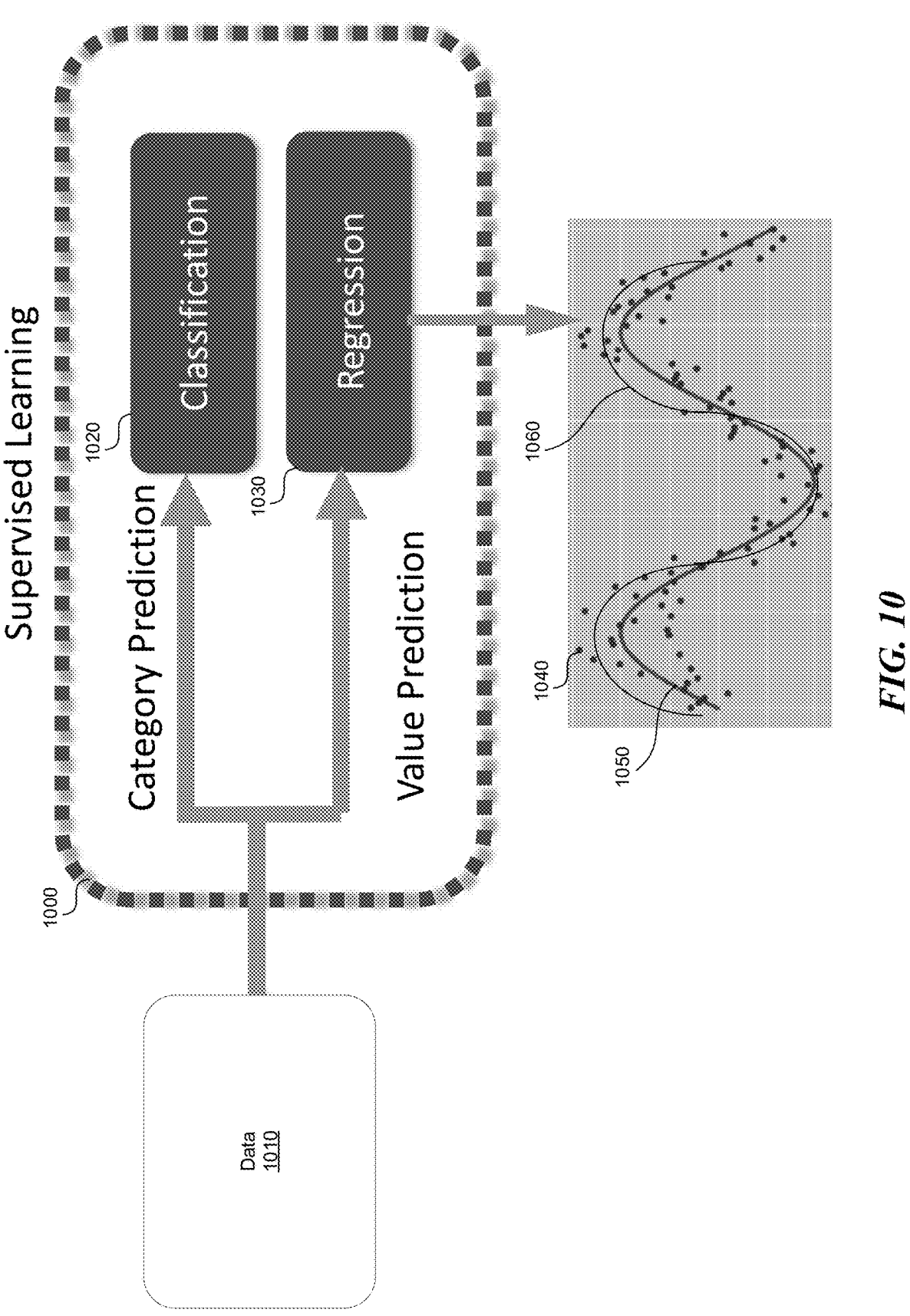
FIG. 10 shows operation of a machine learning model in identifying an outage.

FIG. 10 shows operation of a machine learning model in identifying an outage. During training, the machine learning model 1000 can take data 1010 as input. The data 1010 can include system logs, application logs, device logs, etc., that have been recorded prior to an outage. The machine learning model 1000, in step 1020, can classify the incoming data into a category indicating the incoming data likely causing the outage.

For example, the category can include CPU load or memory usage, thus indicating that CPU load or memory usage, respectively, are abnormal and likely causing the outage. In addition, the machine learning model 1000 can categorize the type of the anomaly as linear, sinusoidal, polynomial, etc.

Based on the type of the anomaly, the machine learning model 1000, in step 1030, can perform a regression analysis, such as linear regression, sinusoidal regression, polynomial regression, logistic regression, etc. For example, the dots 1040 can represent current CPU load, which is anomalous. Machine learning model 1000, in step 1020, can categorize the anomalous CPU load as sinusoidal, and in step 1030, the machine learning model 1000 can perform a sinusoidal regression and fit a curve 1050 as representing the CPU anomaly.

When the machine learning model 1000 is deployed and encounters a CPU load through which a curve 1060, similar to the curve 1050, is fitted, the machine learning model 1000 can predict an upcoming hardware outage. The similarity between the curves 1060 and 1050 can indicate the confidence that the outage will occur. The similarity between the curves 1060 and 1050 can be calculated by aligning the curve 1060 with the curve 1050 and calculating an area between the two curves.

Figure 11A:
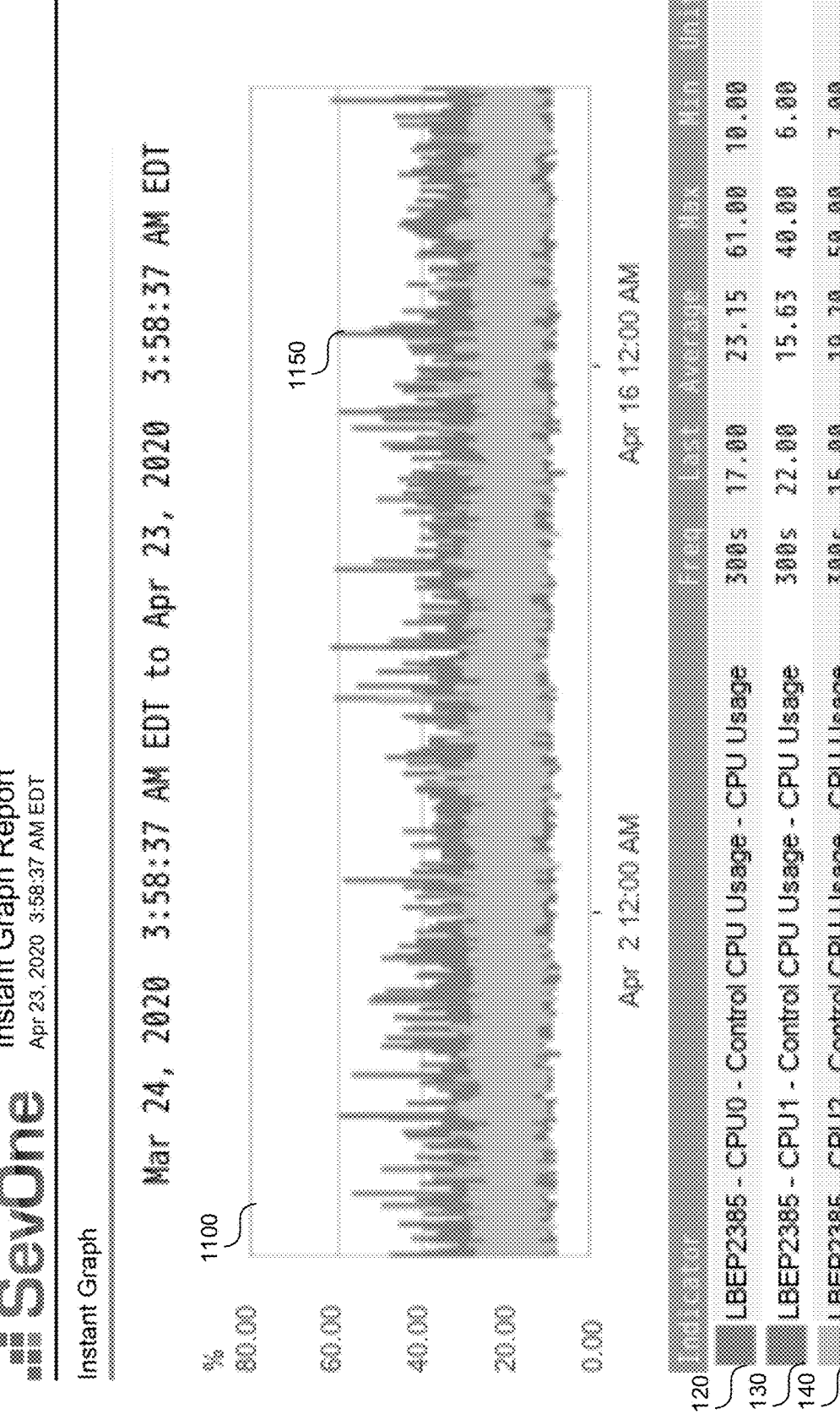
FIGS. 11A-11B show an anomaly in the CPU load.
Figure 11B:
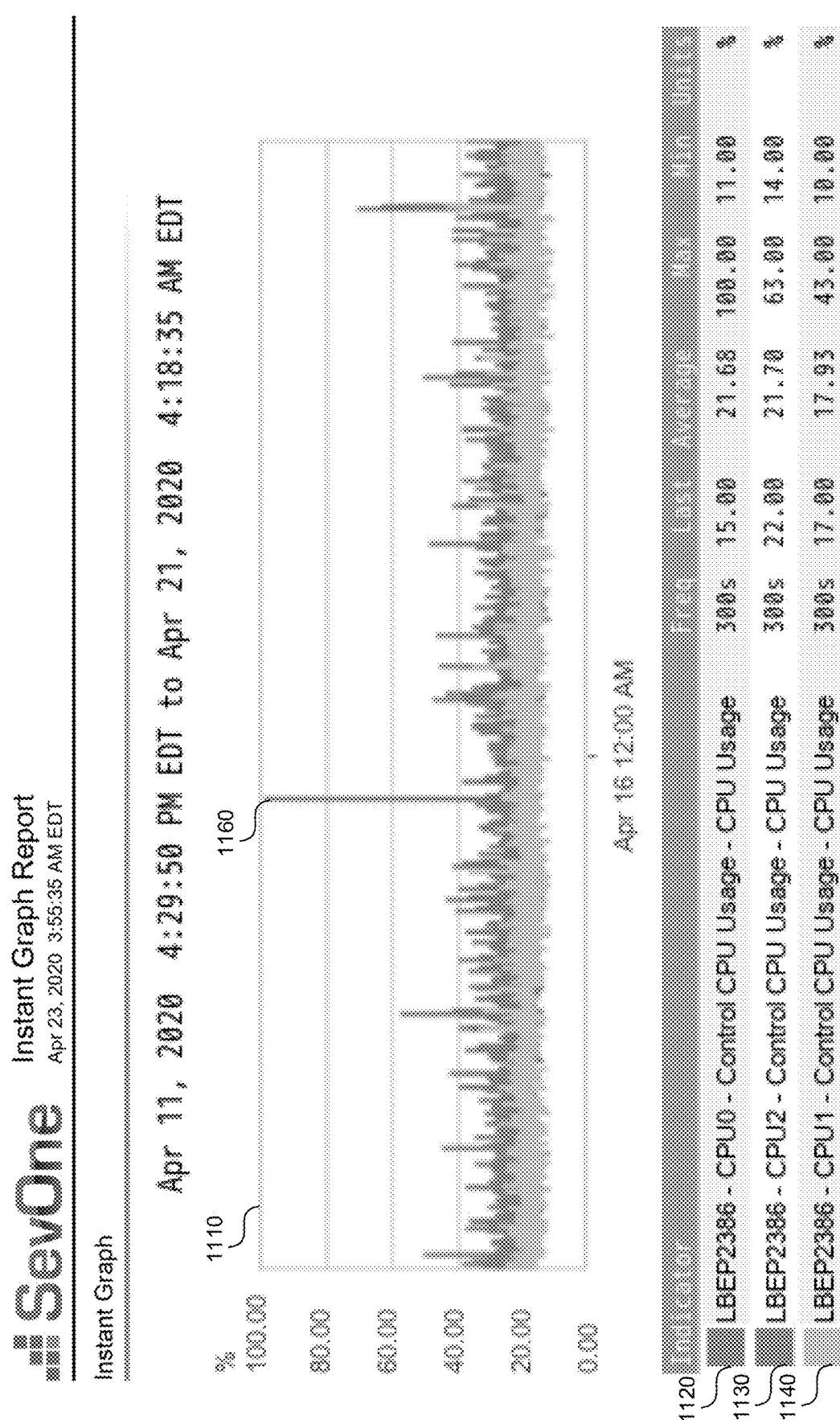

FIGS. 11A-11B show an anomaly in the CPU load. Graphs 1100, 1110 show how the CPU load varies over time for multiple CPUs 1120, 1130, 1140. The y-axis of each graph 1100, 1110 represents the percentage of the maximum CPU load.

The graphs 1100, 1110 can show anomalies 1150, 1160 (only two labeled for brevity) which indicate an unusually high CPU load. The anomalies can be defined as a CPU load that is over 60%, or a spike in the CPU load that is 20% higher than the average CPU load within a predetermined time window, such as several hours, minutes, or seconds.

The anomaly 1150, 1160 can be related to a hardware outage, and a machine learning model can predict a hardware outage as described in this application. For example, a new software can be installed at the load balancer 900 in FIG. 9, such as a new encryption method, e.g., SSL. Because encryption and decryption can be computationally intensive, the new encryption method can cause an increase in CPU load and can cause a spike in the graph 1100, 1110 indicative of an upcoming outage.

If the machine learning model 1000 in FIG. 10 detects the anomaly 1150, 1160, the machine learning model 1000 can generate a warning of the upcoming outage. As a result, even before the outage occurs, the encryption method can be disabled or modified prior to the outage affecting users. For example, the SSL encryption method can be changed from 256-bit SSL, which is more computationally intensive, to a 128-bit SSL encryption method, which is less computationally intensive.

Figure 12:
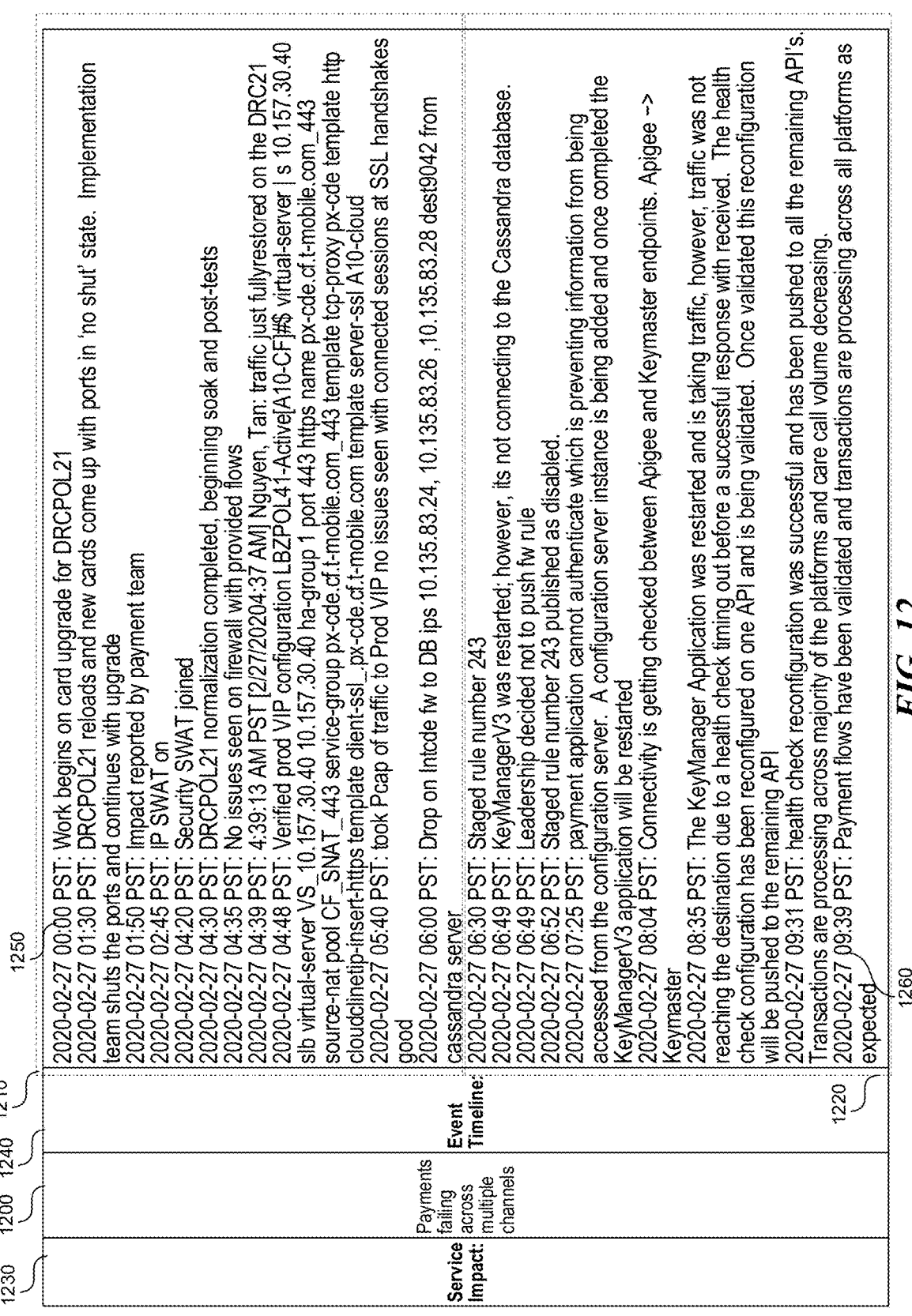
FIG. 12 shows a record in a database.

FIG. 12 shows a record 1200 in a database 770 in FIG. 7. The record 1200 can include both an issue ticket 1210 and the issue ticket resolution 1220, as well as a description of service impact 1230. The record 1200 represents a highest priority issue ticket, e.g., priority 1, because the service impact 1230 is that payments failing across multiple channels are affecting a large number of users.

The issue ticket 1210 can be a part of an event timeline 1240, with time stamps 1250 (only one labeled for brevity) and a description of the event. Similarly, the issue ticket resolution 1220 can be part of the same record as the issue 1210 and can be a part of the event timeline 1240, with time stamps 1260 (only one labeled for brevity).

Figure 13:
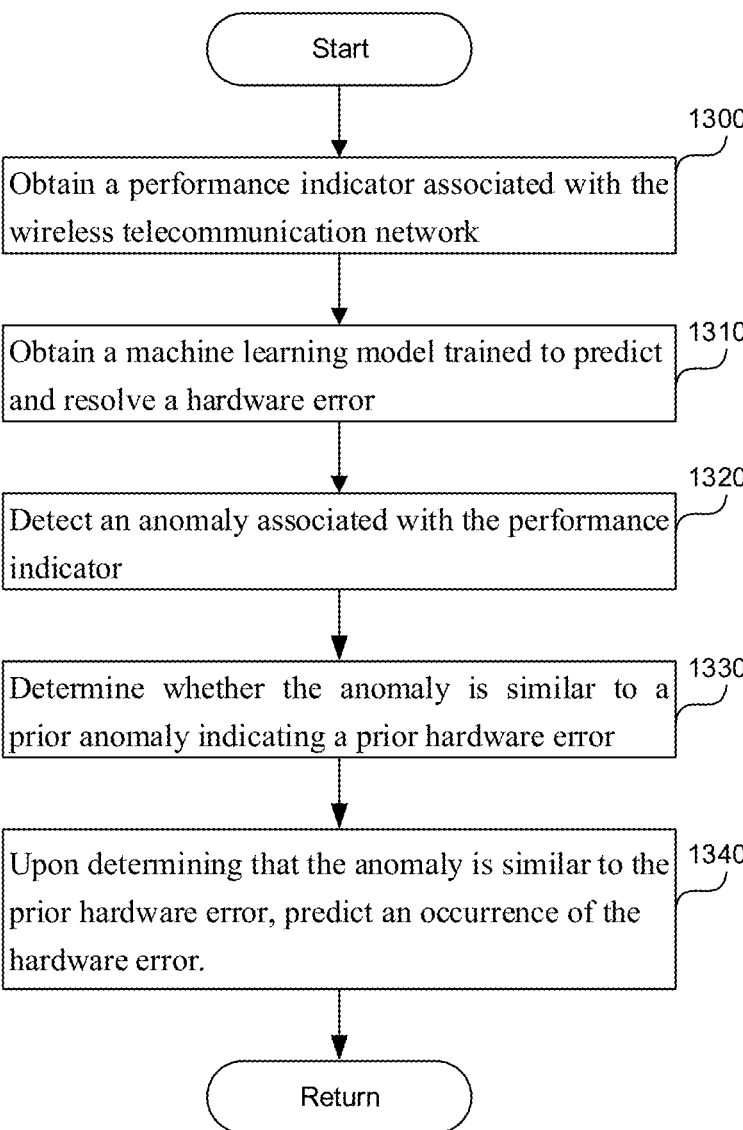
FIG. 13 is a flowchart of a method to automatically predict and resolve a hardware error in a wireless telecommunication network.

FIG. 13 is a flowchart of a method to automatically predict and resolve a hardware error in a wireless telecommunication network. The hardware error is associated with a hardware element such as load balancer.

In step 1300, a hardware or a software processor can obtain a performance indicator associated with the wireless telecommunication network including a system performance indicator or an application log. The system log can include a CPU load, memory consumption, hard drive consumption, GPU load, and/or ethernet traffic indicator. The application log can include an application log associated with network hardware element, and/or an application log associated with a software application.

In step 1310, the processor can obtain a machine learning model trained to predict and resolve the hardware error based on the performance indicator. To obtain the machine learning model, the processor can train the machine learning model. To train the machine learning model, the processor can obtain a historical application log, historical system performance indicator, or a historical record of prior hardware errors including the multiple issue tickets and the multiple issue ticket resolutions. The processor can train the machine learning model to detect the anomaly, predict the occurrence of the hardware error, and obtain the resolution to the prior hardware error based on the historical application log, the historical system performance indicator, and the historical record of prior hardware errors comprising multiple issue tickets and multiple issue ticket resolutions.

In step 1320, the processor can detect, by the machine learning model, an anomaly associated with the performance indicator by detecting an infrequent occurrence in the performance indicator. For example, the system performance indicator can include a CPU load of a CPU. To detect the anomaly, the processor can detect that the CPU load of the CPU is exceeding a temporally proximate CPU load by more than 10%. For example, if the CPU load surrounding the peak anomaly is 50%, and the CPU load of the peak exceeds 55%, the processor can detect that the peak is anomalous. Alternatively, the processor can determine that the peak is anomalous when the peak exceeds a 60% CPU load, without comparison to the temporally proximate CPU load.

In step 1330, the processor running the machine learning model can determine whether the anomaly is similar to a prior anomaly indicating a prior hardware error. To determine similarity, the processor can categorize the anomaly into a category where the anomaly occurred such as the application log and the system performance indicator. The category can further be subdivided into one or more categories of CPU anomaly, memory anomaly, ethernet traffic anomaly, GPU anomaly, disk anomaly, software application anomaly, and/or hardware application anomaly.

Based on the category, the processor can match the anomaly to the prior anomaly occurring in the same category. For example, if the current anomaly is categorized as a CPU anomaly, the processor can compare the current anomaly to prior anomalies that were also categorized as the CPU anomaly. The processor can compare a temporal window surrounding the anomaly and a prior temporal window surrounding the prior anomaly. The temporal window can be measured in seconds, minutes, and/or hours. The processor can calculate a difference between data points in the temporal window and data points in the prior temporal window. To calculate the difference between data points, the processor can fit a curve to each set of points, as shown in FIG. 10, and calculate the difference between the two curves. When the difference is within a predetermined threshold, the processor can determine that the anomaly and the prior anomaly are similar.

In step 1340, upon determining that the anomaly is similar to the prior hardware error, the processor can predict an occurrence of the hardware error.

Once the processor identifies a similar prior anomaly associated with a prior hardware error, the processor can obtain a resolution to the prior hardware error from a database storing multiple issue tickets and multiple issue ticket resolutions. The processor can provide a notification of the anomaly, the hardware error, and the resolution. The processor can provide notification before the hardware error occurs, or shortly after the hardware error occurs, thus reducing the time needed to resolve the error and reducing number of users impacted.

Computer

Figure 14:
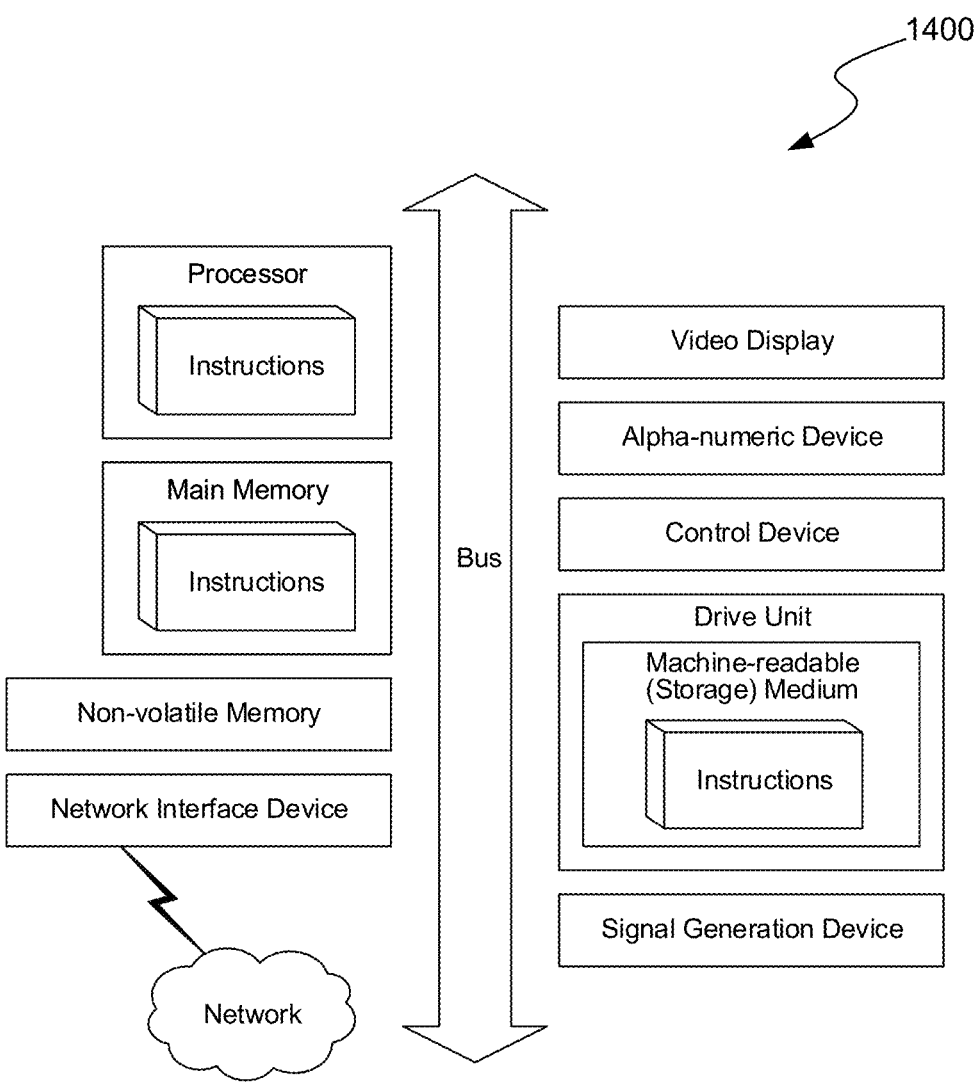
FIG. 14 is a diagrammatic representation of a machine in the example form of a computer system within which a set of instructions, for causing the machine to perform any one or more of the methodologies or modules discussed herein, can be executed.

FIG. 14 is a diagrammatic representation of a machine in the example form of a computer system 1400 within which a set of instructions, for causing the machine to perform any one or more of the methodologies or modules discussed herein, can be executed.

In the example of FIG. 14, the computer system 1400 includes a processor, memory, non-volatile memory, and an interface device. Various common components (e.g., cache memory) are omitted for illustrative simplicity. The computer system 1400 is intended to illustrate a hardware device on which any of the components described in the example of FIGS. 1-13 (and any other components described in this specification) can be implemented. The computer system 1400 can be of any applicable known or convenient type. The components of the computer system 1400 can be coupled together via a bus or through some other known or convenient device.

The processor of the computer system 1400 can perform the various instructions described in this application. For example, the processor of the computer system 1400 can execute instructions of the machine learning model 150, 160, 170 in FIG. 1; 780 in FIG. 7; 800, 820 in FIG. 8; 1000 in FIG. 10. The processor of the computer system 1400 can execute instructions of the various components 120, 130, 140 in FIG. 1, and/or the instructions shown in the flowcharts in FIGS. 2-6, and 13. The main memory, the non-volatile memory and/or the drive unit of the computer system 1400 can store the instructions executed by the processor. The various components of the system shown in FIGS. 1-13 can communicate with each other using the network of the computer system 1400.

This disclosure contemplates the computer system 1400 taking any suitable physical form. As example and not by way of limitation, computer system 1400 can be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1400 can include one or more computer systems 1400; be unitary or distributed; span multiple locations; span multiple machines; or reside in a cloud, which can include one or more cloud components in one or more networks. Where appropriate, one or more computer systems 1400 can perform without substantial spatial or temporal limitation one or more steps of one or more methods described or illustrated herein. As an example, and not by way of limitation, one or more computer systems 1400 can perform in real time or in batch mode one or more steps of one or more methods described or illustrated herein. One or more computer systems 1400 can perform at different times or at different locations one or more steps of one or more methods described or illustrated herein, where appropriate.

The processor can be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disc, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1400. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing an entire large program in memory cannot even be possible. Nevertheless, it should be understood that for software to run, if necessary, it is moved to a computer-readable location appropriate for processing, and for illustrative purposes, that location is referred to as the memory in this application. Even when software is moved to the memory for execution, the processor will typically make use of hardware registers to store values associated with the software, and a local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1400. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 14 reside in the interface.

In operation, the computer system 1400 can be controlled by operating system software that includes a file management system, such as a disk operating system. One example of operating system software with associated file management system software is the family of operating systems known as Windows® from Microsoft Corporation of Redmond, Washington, and its associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description can be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems can be used with programs in accordance with the teachings herein, or it can prove convenient to construct more specialized apparatus to perform the methods of some embodiments. The required structure for a variety of these systems will appear from the description below. In addition, the techniques are not described with reference to any particular programming language, and various embodiments can thus be implemented using a variety of programming languages.

In alternative embodiments, the machine operates as a standalone device or can be connected (e.g., networked) to other machines. In a networked deployment, the machine can operate in the capacity of a server or a client machine in a client-server network environment, or as a peer machine in a peer-to-peer (or distributed) network environment.

The machine can be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical discs (e.g., Compact Disk Read-Only Memory (CD-ROMS), Digital Versatile Disks, (DVDs), etc.), among others, and transmission type media such as digital and analog communication links.

In some circumstances, operation of a memory device, such as a change in state from a binary one to a binary zero or vice-versa, for example, can comprise a transformation, such as a physical transformation. With particular types of memory devices, such a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device can comprise a transformation, such as a physical transformation. Rather, the foregoing is intended as illustrative examples.

A storage medium typically can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Remarks

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, and any that may be listed in accompanying filing papers, are incorporated herein by reference in the entirety, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. § 112(f), other aspects may likewise be embodied as a means-plus-function claim, or in other forms, such as being embodied in a computer-readable medium. (Any claims intended to be treated under 35 U.S.C. § 112(f) will begin with the words "means for," but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

We claim:

1. At least one tangible computer-readable medium, which when executed by at least one data processor, implements operations, comprising:

obtaining, from a hardware component of a wireless telecommunications network, a performance indicator associated with the wireless telecommunications network, wherein the performance indicator includes at least one of a system performance indicator or an application log;

providing the performance indicator to a machine learning model trained to address a hardware error, wherein the machine learning model is trained to predict an occurrence of a hardware error and determine a resolution for the hardware error based on at least two of: prior hardware errors, a historical application log, historical system performance indicators, or a historical record of prior hardware errors, the historical record of prior hardware errors comprising a plurality of issue tickets and a plurality of issue ticket resolutions, and wherein the machine learning model is trained by:

obtaining the historical application log, the historical system performance indicators, or the historical record of prior hardware errors comprising the plurality of issue tickets and the plurality of issue ticket resolutions; and training the machine learning model to detect an anomaly, predict the occurrence of the hardware error, and obtain the resolution to the prior hardware error based on the historical application log, the historical system performance indicators, and the historical record of prior hardware errors comprising the plurality of issue tickets and the plurality of issue ticket resolutions;

detecting, using the machine learning model, an anomaly associated with the performance indicator based on a frequency of occurrence of the performance indicator, wherein the anomaly is associated with a component of the wireless telecommunications network;

identifying, using a service registry, one or more additional components likely to be affected by the anomaly, wherein the one or more additional components comprise components of the wireless telecommunications network that are connected to the component, wherein the service registry comprises a directed graph network, wherein each node of the directed graph network represents one or more components of the wireless telecommunications network, and wherein each edge of the directed graph network indicates dependencies between components of the wireless telecommunications network;

automatically notifying the one or more additional components of the anomaly, wherein the automatic notification prevents propagation of the hardware error to the one or more additional components;

determining, using the machine learning model, a resolution to the anomaly based on a prior anomaly indicating a prior hardware error, wherein determining the resolution comprises determining similarity between the anomaly and the prior anomaly by fitting a curve to data points in a temporal window surrounding the anomaly, fitting a prior curve to data points in a prior temporal window surrounding the prior anomaly, and calculating a difference between the curve and the prior curve; and automatically executing the resolution to address the hardware error prior to the hardware error affecting users of the wireless telecommunications network.

2. The at least one tangible computer-readable medium of claim 1, wherein the performance indicator includes a CPU load or the application log associated with a piece of hardware.

3. The at least one tangible computer-readable medium of claim 1, wherein the hardware error is associated with a hardware element comprising a load balancer.

4. The at least one tangible computer-readable medium of claim 1, wherein the system performance indicator comprises a CPU load of a CPU, and wherein detecting the anomaly comprises:

determining that the CPU load of the CPU exceeds a temporally proximate CPU load of the CPU by more than 10%.

5. The at least one tangible computer-readable medium of claim 1, further comprising instructions to:

categorize the anomaly into a category where the anomaly occurred, the category including the application log and the system performance indicator.

6. The at least one tangible computer-readable medium of claim 1, further comprising instructions to:

provide an indication of the hardware error.

7. The at least one tangible computer-readable medium of claim 1, further comprising instructions to:

determine an anomaly in CPU load by performing a regression analysis of CPU load values, wherein the regression analysis determines at least one of a linear regression, a sinusoidal regression, a polynomial regression, or a logistic regression.

8. A method comprising:

obtaining, from a hardware component of a wireless telecommunications network, a performance indicator associated with the wireless telecommunications network, wherein the performance indicator comprises at least one of a system performance indicator or an application log;

providing the performance indicator to a machine learning model trained to address a hardware error, wherein the machine learning model is trained to predict an occurrence of a hardware error and determine a resolution a resolution for the hardware error based on at least two of: prior hardware errors, a historical application log, historical system performance indicators, or a historical record of prior hardware errors comprising a plurality of issue tickets and a plurality of issue ticket resolutions, and wherein the machine learning model is trained by:

obtaining the historical application log, the historical system performance indicators, or the historical record of prior hardware errors comprising the plurality of issue tickets and the plurality of issue ticket resolutions; and training the machine learning model to detect an anomaly, predict the occurrence of the hardware error, and obtain the resolution to the prior hardware error based on the historical application log, the historical system performance indicators, and the historical record of prior hardware errors comprising the plurality of issue tickets and the plurality of issue ticket resolutions;

detecting, using the machine learning model, an anomaly associated with the performance indicator based on an infrequent occurrence in the performance indicator, wherein the anomaly is associated with a component of the wireless telecommunications network;

identifying, using a service registry, one or more additional components likely to be affected by the anomaly, wherein the one or more additional components comprise components of the wireless telecommunications network that are connected to the component, wherein the service registry comprises a directed graph network, wherein each node of the directed graph network represents one or more components of the wireless telecommunications network, and wherein each edge of the directed graph network indicates dependencies between components of the wireless telecommunications network; and automatically notifying the one or more additional components of the anomaly, wherein the automatic notification prevents propagation of the hardware error to the one or more additional components;

determining, using the machine learning model, a resolution to the anomaly based on a prior anomaly indicating a prior hardware error, wherein determining the resolution comprises determining similarity between the anomaly and the prior anomaly by fitting a curve to data points in a temporal window surrounding the anomaly, fitting a prior curve to data points in a prior temporal window surrounding the prior anomaly, and calculating a difference between the curve and the prior curve; and automatically executing the resolution to address the hardware error prior to the hardware error affecting users of the wireless telecommunications network.

9. The method of claim 8, wherein the hardware error is associated with a hardware element comprising a load balancer.

10. The method of claim 8, wherein the system performance indicator comprises a CPU load of a CPU, and wherein the detecting the anomaly comprises:

detecting the CPU load of the CPU exceeding a temporally proximate CPU load of the CPU by more than 10%.

11. The method of claim 8, further comprising:

categorizing the anomaly into a category where the anomaly occurred, the category including the application log and the system performance indicator.

12. The method of claim 8, further comprising:

providing an indication of the hardware error.

13. The method of claim 8, further comprising:

determining an anomaly in CPU load by performing a regression analysis of CPU load values, wherein the regression analysis determines at least one of a linear regression, a sinusoidal regression, a polynomial regression, or a logistic regression.

14. A system comprising:

one or more processors; and a memory coupled to the one or more processors, wherein the memory stores instructions executable by the one or more processors to:

obtain, from a hardware component of a wireless telecommunications network, a performance indicator associated with the wireless telecommunications network, wherein the performance indicator includes at least one of a system performance indicator or an application log;

provide the performance indicator to a machine learning model trained to address a hardware error, wherein the machine learning model is trained to predict an occurrence of a hardware error and determine a resolution for the hardware error based on at least two of: prior hardware errors, a historical application log, historical system performance indicators, or a historical record of prior hardware errors, the historical record of prior hardware errors comprising a plurality of issue tickets and a plurality of issue ticket resolutions, and wherein the machine learning model is trained by:

obtaining the historical application log, the historical system performance indicators, or the historical record of prior hardware errors comprising the plurality of issue tickets and the plurality of issue ticket resolutions; and training the machine learning model to detect an anomaly, predict the occurrence of the hardware error, and obtain the resolution to the prior hardware error based on the historical application log, the historical system performance indicators, and the historical record of prior hardware errors comprising the plurality of issue tickets and the plurality of issue ticket resolutions;

detect, using the machine learning model, an anomaly associated with the performance indicator based on an infrequent occurrence in the performance indicator;

identify, using a service registry, one or more additional components likely to be affected by the anomaly, wherein the one or more additional components comprise components of the wireless telecommunications network that are connected to the component, wherein the service registry comprises a directed graph network, wherein each node of the directed graph network represents one or more components of the wireless telecommunications network, and wherein each edge of the directed graph network indicates dependencies between components of the wireless telecommunications network; and automatically notify the one or more additional components of the anomaly, wherein the automatic notification prevents propagation of the hardware error to the one or more additional components;

determine, using the machine learning model, a resolution to the anomaly based on a prior anomaly indicating a prior hardware error, wherein determining the resolution comprises determining similarity between the anomaly and the prior anomaly by fitting a curve to data points in a temporal window surrounding the anomaly, fitting a prior curve to data points in a prior temporal window surrounding the prior anomaly, and calculating a difference between the curve and the prior curve; and automatically execute the resolution to address the hardware error prior to the hardware error affecting users of the wireless telecommunications network.

15. The system of claim 14, wherein the performance indicator includes a CPU load or the application log associated with a piece of hardware.

16. The system of claim 14, wherein the hardware error is associated with a hardware element comprising a load balancer.

17. The system of claim 14, wherein the system performance indicator comprises a CPU load of a CPU, and wherein the instructions to detect the anomaly comprise instructions to:

detect the CPU load of the CPU exceeding a temporally proximate CPU load of the CPU by more than 10%.

18. The system of claim 14, wherein the instructions are further configured to, when executed by the one or more processors, cause the system to:

categorize the anomaly into a category where the anomaly occurred, the category including the application log and the system performance indicator.

19. The system of claim 14, further comprising instructions to:

provide an indication of the hardware error and the resolution.

20. The system of claim 14, further comprising instructions to:

determine an anomaly in CPU load by performing a regression analysis of CPU load values, wherein the regression analysis determines at least one of a linear regression, a sinusoidal regression, a polynomial regression, or a logistic regression.

* * * * *